United States Patent
Mito et al.

(10) Patent No.: US 10,647,198 B2
(45) Date of Patent: May 12, 2020

(54) FOUR-WHEEL DRIVE VEHICLE

(71) Applicant: Mazda Motor Corporation, Aki-gun, Hiroshima (JP)

(72) Inventors: Eiji Mito, Hiroshima (JP); Hideki Murata, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 239 days.

(21) Appl. No.: 15/874,113

(22) Filed: Jan. 18, 2018

(65) Prior Publication Data

US 2018/0215256 A1     Aug. 2, 2018

(30) Foreign Application Priority Data

Feb. 2, 2017 (JP) .................... 2017-017405

(51) Int. Cl.
*B60K 17/16* (2006.01)
*B60K 17/344* (2006.01)
*B60K 23/08* (2006.01)

(52) U.S. Cl.
CPC ............ *B60K 17/16* (2013.01); *B60K 17/165* (2013.01); *B60K 17/344* (2013.01); *B60K 23/08* (2013.01)

(58) Field of Classification Search
CPC .... B60K 17/16; B60K 17/165; B60K 17/344; B60K 17/3467; B60K 23/08; B60K 17/00; B60K 17/348; B60K 17/354
See application file for complete search history.

(56) References Cited

U.S. PATENT DOCUMENTS

| | | | |
|---|---|---|---|
| 5,450,921 A * | 9/1995 | Kameda | B60K 5/04 180/297 |
| 7,533,754 B2 * | 5/2009 | Burrows | B60K 6/48 180/248 |
| 8,556,773 B2 | 10/2013 | Oba | |

(Continued)

FOREIGN PATENT DOCUMENTS

| JP | 09323557 A | 12/1997 |
|---|---|---|
| JP | H9323557 A | 12/1997 |
| JP | 2001030784 A | 2/2001 |

(Continued)

*Primary Examiner* — Jacob S. Scott
*Assistant Examiner* — Lillian T Nguyen
(74) *Attorney, Agent, or Firm* — Alleman Hall Creasman & Tuttle LLP

(57) ABSTRACT

A four-wheel drive vehicle is disclosed, which includes an engine, a rear propeller shaft, a rear differential gear, a transfer mechanism, a front propeller shaft, and a front differential gear. The front propeller shaft is arranged so as to pass through a vicinity of an outside of a room of a pedal working space of a driver's seat and extend toward a front part of the vehicle. In such a four-wheel drive vehicle, the gear ratio of the front differential gear may be $R_F$, the final gear ratio of the rear differential gear may be $R_R$, the transmission ratio of the transfer mechanism may be $R_T$, and the relationships $R_F < R_R$ and $R_T > 1$ may be satisfied.

4 Claims, 3 Drawing Sheets

(56) References Cited

U.S. PATENT DOCUMENTS 9,254,746 B2   2/2016  Yokoo
2013/0274055 A1* 10/2013  Horaguchi ......... B60K 17/3515
                                                      475/221

FOREIGN PATENT DOCUMENTS

| JP | 2001277881 A | 10/2001 |
| JP | 2015206372 A | 11/2015 |
| WO | 2011042951 A1 | 4/2011 |
| WO | 2013001598 A1 | 1/2013 |

* cited by examiner

FOUR-WHEEL DRIVE VEHICLE

FIELD OF THE INVENTION

The present invention relates to a four-wheel drive vehicle, specifically a four-wheel drive vehicle based on a front engine/rear-wheel drive (FR) vehicle.

BACKGROUND ART

For example, a configuration of a four-wheel drive vehicle based on a FR vehicle is shown in Patent Document 1. The four-wheel drive vehicle shown in Patent Document 1 comprises an engine that is mounted on a front part of the vehicle, a transmission that is vertically installed, a transfer mechanism that is connected to an output side of the transmission, a rear propeller shaft and a front propeller shaft that are connected to the transfer mechanism and extend along the longitudinal direction of the vehicle, and a rear differential gear and a front differential gear to which each propeller shaft is connected. The front propeller shaft is along the outside of transmission and extends to the arranged position of the front differential gear on the front part of the vehicle.

On a four-wheel drive vehicle that has a configuration like the above, the driving force generated by the engine is transmitted to the transfer mechanism through the transmission, divided at the transfer mechanism, and transmitted to the rear propeller shaft and the front propeller shaft respectively. Then, the driving force is transmitted from the drive shaft to the front wheels and the rear wheels respectively through each of the front and rear differential gears.

RELATED ART PATENT DOCUMENT

Patent Document 1

Japanese Unexamined Patent Application Publication 2001-30784

SUMMARY OF THE INVENTION

Problems to be Solved by the Invention

However, the foot space of a front seat can be influenced by arranging the front propeller shaft in prior art four-wheel drive vehicles based on FR vehicles. Specifically, when the front propeller shaft is arranged to a driver's seat side, the position of pedals in the foot space of the driver might be offset from an ergonomically ideal position.

When the pedal working space of the driver's seat is interfered with by the influence of the front propeller shaft, the fatigue of the driver is increased by a long drive and the like, which is unfavorable.

The present invention aims to solve the above problems, and to provide a four-wheel drive vehicle that can reduce the influence on the foot space of the front seat caused by arrangement of the front propeller shaft.

BRIEF SUMMARY OF THE INVENTION

A four-wheel drive vehicle according to one aspect of the present invention includes a power source, a rear propeller shaft, a rear differential gear, a transfer mechanism, a front propeller shaft, and a front differential gear.

The power source may be mounted on a front part of the vehicle (the four-wheel drive vehicle), generates rotational driving force, and is configured such that an output axis is provided along a longitudinal direction of the vehicle.

The rear propeller shaft may be connected to the power source and extend toward a rear part of the vehicle.

The differential gear may be connected to the rear propeller shaft.

The transfer mechanism may be provided in a power transmission path of the rotation driving force generated at the power source.

The front propeller shaft may be connected to the transfer mechanism, and extend toward the front part of the vehicle along a direction in which the output axis extends.

The front differential gear may be connected to the front propeller shaft and arranged in a front part of the vehicle.

According to the four-wheel drive vehicle of this aspect, a gear ratio of the front differential gear is smaller than a final gear ratio of the rear differential gear. Moreover, according to the four-wheel drive vehicle of this aspect, a transmission ratio of the transfer mechanism is set according to the gear ratio of the front differential gear and the final gear ratio of the rear differential gear.

According to the four-wheel drive vehicle of this aspect, since the gear ratio of the front differential gear is made smaller than the final gear ratio of the rear differential gear, and also the transmission ratio of the transfer mechanism is set according to the gear ratio of the front differential gear and the final gear ratio of the rear differential gear, the rotation speed of the front propeller shaft can be kept lower than is conventional.

Although the rotation speed (the usable rotation speed) of the front propeller shaft is required to be lower than a bending natural frequency (rotation speed), by reducing the rotation speed as described above, even if a shaft diameter is made thinner at a conventional ratio, the occurrence of a bending resonance can be also suppressed.

Therefore, according to the four-wheel drive vehicle of the above aspect, since the shaft diameter of the front propeller shaft can be made thin, the influence (interference) to the foot space of the front seat can be reduced by the difference in diameter.

According to a four-wheel drive vehicle of another aspect of the present invention, in the above configuration, the transmission ratio of the transfer mechanism may be greater than 1.

According to the four-wheel drive vehicle of this aspect, since the transmission ratio of the transfer mechanism is made greater than 1, the rotation speed of the front propeller shaft can be kept lower than that of the rear propeller shaft. Therefore, according to the four-wheel drive vehicle of this aspect, since the shaft diameter of the front propeller shaft can be made thin, the influence (interference) to the foot space of the front seat can be reduced by the difference in diameter.

According to a four-wheel drive vehicle according to another aspect of the present invention, in the above configuration, a four-wheel drive (4WD) coupling for controlling a power distribution to the front differential gear may be inserted into a power transmission path between the driving source and the rear differential gear.

According to the four-wheel drive vehicle of the above aspect, since the 4WD coupling is inserted between the driving source and the rear differential gear, appropriate power distribution to the front and rear wheels according to the various road surface conditions is possible.

In a four-wheel drive vehicle according to another aspect of the present invention, in the above configuration, the relationships of $R_F \times R_T < R_T$ is satisfied, where the gear ratio of the front differential gear is $R_F$, the final gear ratio of the rear differential gear is $R_R$, and the transmission ratio of the transfer mechanism is $R_T$.

Since the relationships of $R_F \times R_T < R_T$ is satisfied, by performing the differential rotation, which rotates the front differential gear side a little slower, between each friction plate of the 4WD coupling even in the two-wheel drive state, the four-wheel drive vehicle according to the above aspect can improve the responsiveness of the driving force transmission by coupling when shifting to the four-wheel drive state and has the advantage of securing high driving performance as a four-wheel drive vehicle.

According to a four-wheel drive vehicle of another aspect of the present invention, in the above configuration, the front propeller shaft is arranged so as to pass through a vicinity of an outside of a room of a pedal working space of the driver's seat.

According to the four-wheel drive vehicle of the above aspect, although the front propeller shaft passes through the vicinity of the outside the room of the pedal working space (foot space) of the driver's seat, since the shaft diameter of the front propeller shaft can be made thin at a conventional ratio as discussed above, the influence (interference) to the pedal working space can be reduced. Accordingly, the four-wheel drive vehicle of this aspect can improve the driving feeling for the driver and suppress the increase in the fatigue even brought on by a long drive.

Effects of the Invention

The four-wheel drive vehicle of the above aspects can reduce the influence to the foot space of the front seat by the arrangement of a propeller shaft.

DETAILED DESCRIPTION OF THE EMBODIMENTS

Hereinafter, embodiments of the present invention will be described with reference to the Figures. It will be understood that the embodiments described herein are exemplary in nature, and that these specific configurations are not to be considered in a limiting sense, because numerous variations are possible.

1. Overview Configuration of a Four-Wheel Drive Vehicle 1.

An overview configuration of a four-wheel drive vehicle 1 according to the present embodiment will be described by with reference to FIG. 1.

Figure 1:
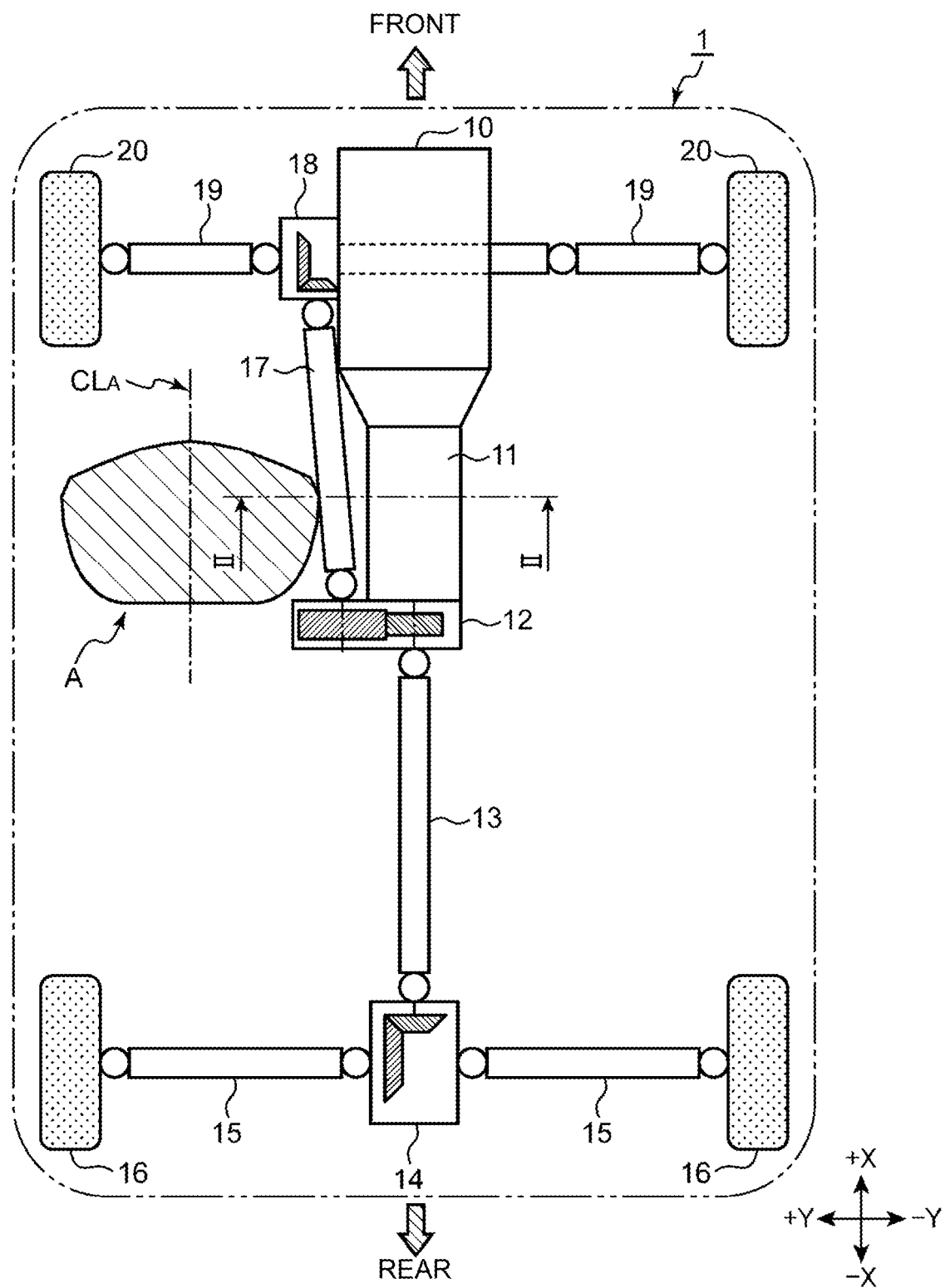
FIG. 1 is a schematic diagram showing an overview configuration according to a first embodiment of a four-wheel drive vehicle 1.

As shown in FIG. 1, an engine 10 as a power source is mounted to a vehicle front part (+X side part) of a four-wheel drive vehicle 1. The engine 10, for example, is a gasoline engine or a diesel engine. The engine 10 is mounted in the engine room at the front part of the vehicle and placed vertically so that an output axis is along the longitudinal direction (X direction) of the vehicle.

A transmission 11 is provided on the -X side to the engine 10. The transmission 11 is also placed vertically. The transmission 11 is connected to an output shaft formed along the output axis of the engine 10.

A rear propeller shaft 13 is connected to the output side of the transmission 11. The rear propeller shaft 13 is arranged so as to stretch toward the -X side along the longitudinal direction (X direction) of the vehicle. A rear end of the rear propeller shaft 13 is inserted into a rear differential gear 14.

Rear drive shafts 15 are extended from the rear differential gear 14 to the +Y side and the -Y side respectively and rear wheels 16 are connected to each of the rear drive shafts 15.

A transfer mechanism 12 is provided on the output side of the transmission 11. The transfer mechanism 12 has a plurality of gears that mutually engage. A front propeller shaft 17 is connected to the transfer mechanism 12. The front propeller shaft 17 is arranged so as to extend from a connecting part with the transfer mechanism 12 toward the +X side.

The front propeller shaft 17 passes through the vicinity of the outside the room of a pedal working space A of the driver's seat. Then, a front end of the front propeller shaft 17 is inserted into a front differential gear 18. The front differential gear 18 is placed to a lower side part of the engine 10 in the engine room that the engine 10 is mounted. Therefore, the front differential gear 18 is arranged to a front part of the four-wheel drive vehicle 1.

Front drive shafts 19 are extended from the front differential gear 18 to the +Y side and the -Y side respectively and front wheels 20 are connected to each of the front drive shafts 19.

2. Gear Ratio of the Front Differential Gear 18 and Final Gear Ratio of the Rear Differential Gear 14.

A gear ratio of the front differential gear 18 of the four-wheel drive vehicle 1 is set to $R_F$. Moreover, a final gear ratio of the rear differential gear 14 is set to $R_R$. At this time, the four-wheel drive vehicle 1 according to the present embodiment sets the gear ratio so as to satisfy the following relationship.

$$R_F < R_R \quad \text{[Formula 1]}$$

Moreover, when a transmission ratio of the transfer mechanism 12 is $R_T$, the following relationships are also satisfied.

$$R_T > 1 \quad \text{[Formula 2]}$$

$$R_F \times R_T \approx R_R \quad \text{[Formula 3]}$$

On the other hand, a prior art four-wheel drive vehicle has the following relationships.

$$R_F = R_R \quad \text{[Formula 4]}$$

$$R_T = 1 \quad \text{[Formula 5]}$$

According to the present embodiment, a rotation speed of the front propeller shaft 17 can be kept lower than the conventional one by changing the gear ratio $R_F$ of the front differential gear 18, the final gear ratio $R_R$ of the rear differential gear 14, and the transmission ratio $R_T$ of the transfer mechanism 12 at the conventional ratio so as to satisfy the relationships of the above [Formula 1] to [Formula 3].

3. Effectiveness

The effectiveness by the four-wheel drive vehicle 1 according to the present embodiment will be described with reference to FIG. 2 in addition to FIG. 1.

Figure 2:
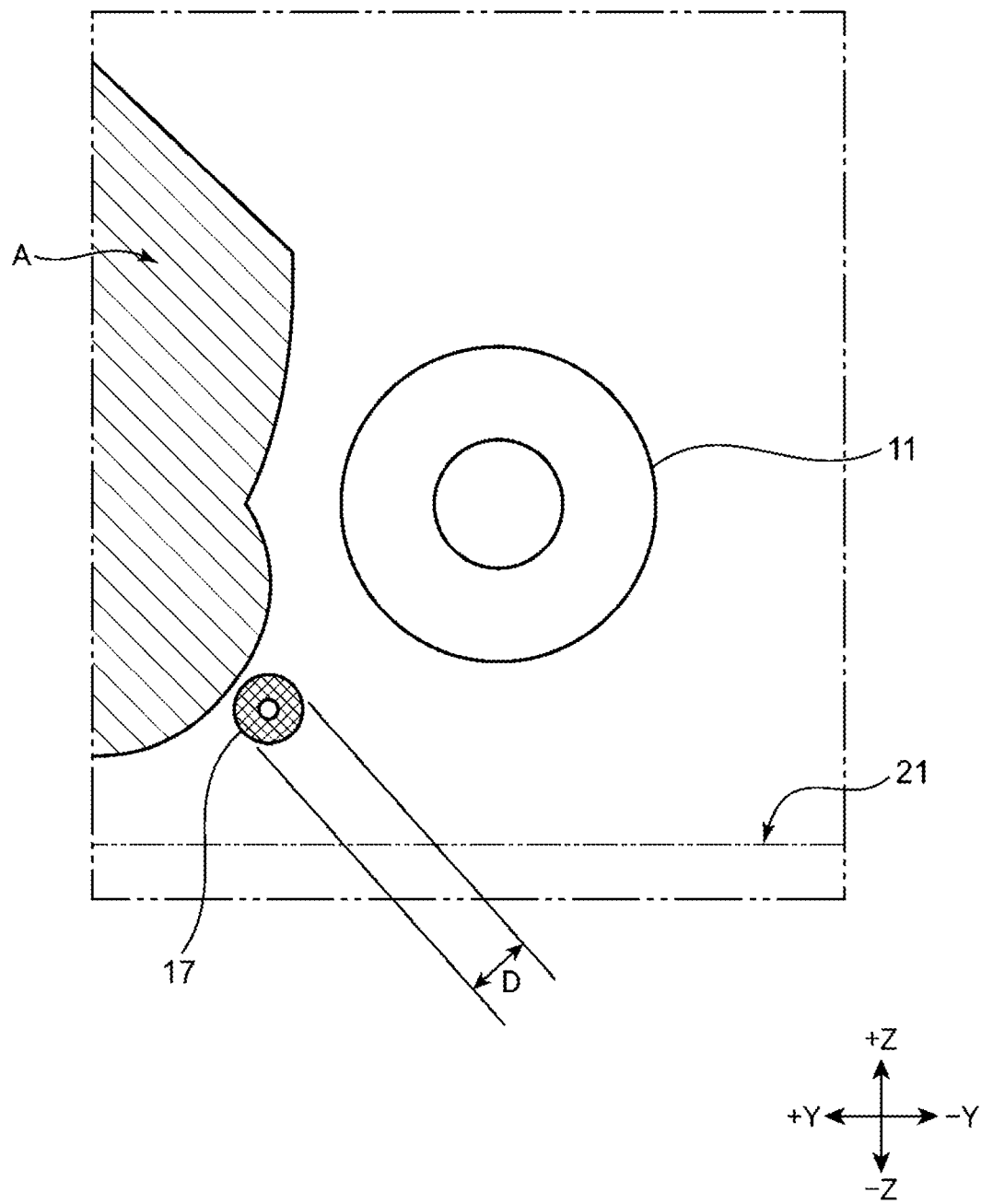
FIG. 2 is a schematic diagram showing the II-II cross section of FIG. 1 and the relationship between the arranged position of the front propeller shaft 17 and the pedal working space A.

As shown in FIG. 1 and FIG. 2, the front propeller shaft 17 according to the present embodiment passes through the vicinity of the outside the room of the pedal working space A of the driver's seat. Moreover, as shown in FIG. 2, the lower the rotation speed of the front propeller shaft 17 is, the thinner a shaft diameter D of the front propeller shaft 17 can be made.

Therefore, when a critical rotation speed of the front propeller shaft 17 is Nc, the relationship becomes the following formula.

$$Nc = f(D) \quad \text{[Formula 6]}$$

Moreover, when a maximum rotation speed of the front propeller shaft 17 is N, a safety factor S is represented by the following formula.

$$S = Nc/N \quad \text{[Formula 7]}$$

When ensuring the equivalence of the safety factor S at the conventional ratio, the lower the maximum rotation speed N of the front propeller shaft is, the thinner the shaft diameter D of the front propeller shaft 17 can be made.

As above, in the present embodiment, by lowering the rotation speed of the front propeller shaft 17, the shaft diameter D of the front propeller shaft 17 can be made thin and the occurrence of bending resonance can be suppressed. Accordingly, the pedal working space A of the driver's seat shown in FIG. 1 can be widened and a central $CL_A$ in the Y direction of the pedal working space A can be in an ideal location (a location not forcing the driver to have difficulty) in relation with other operation apparatus.

Furthermore, the present embodiment applies a hollow type pipe-shaped shaft for the front propeller shaft 17.

Second Embodiment

An overview configuration of a four-wheel drive vehicle 22 according to the second embodiment will be described with reference to FIG. 3. Moreover, in FIG. 3, similar parts to the first embodiment are denoted by similar numerical references and an explanation of these similar parts is omitted below for the sake of brevity.

Figure 3:
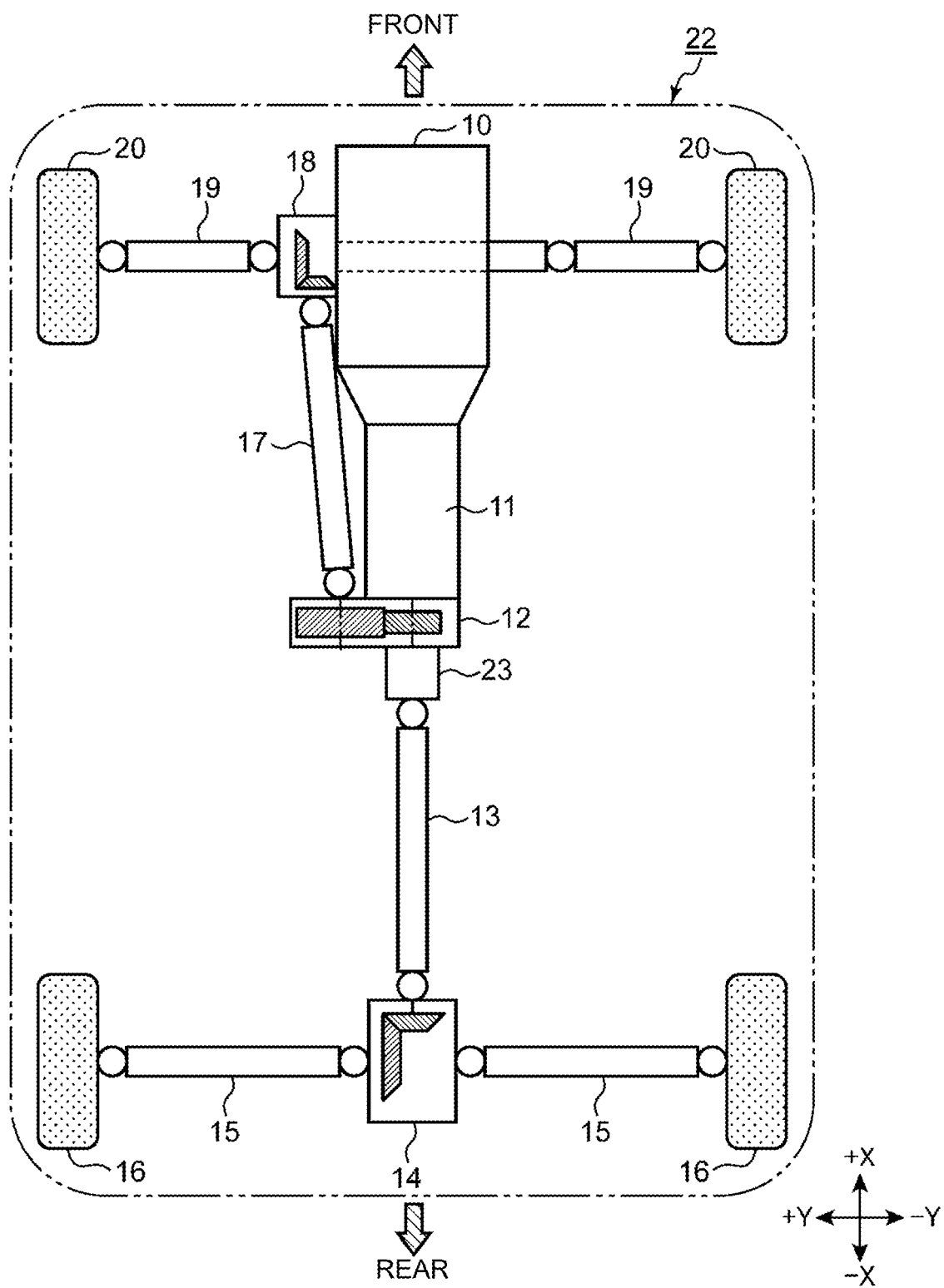
FIG. 3 is a schematic diagram showing an overview configuration of a four-wheel drive vehicle according to a second embodiment.

As shown in FIG. 3, in the four-wheel drive vehicle 22 according to this second embodiment, an electronic control type 4WD coupling 23 for controlling a power distribution to a front differential gear 18 is inserted into a power transmission path between a transmission 11 and a rear propeller shaft 13. The 4WD coupling 23 detects the difference of rotation speed between front wheels 20 and rear wheels 16, and executes optimum power distribution according to the road surface condition or running circumstances.

The four-wheel drive vehicle 22 according to the present embodiment satisfies the relationships above [Formula 1] through [Formula 3] and also satisfies the following formulas.

$$R_F \times R_T < R_R \quad \text{[Formula 8]}$$

Moreover, in one particular example of the present embodiment, $R_F = 2.388$, $R_T = 1.218$, and $R_R = 2.933$.

Furthermore, in the above [Formula 8], the difference between the left side ($R_F \times R_T$) and the right side ($R_R$) may be greater than 0 to approximately 1.5% or less.

Since the four-wheel drive vehicle 22 according to the this second embodiment has a similar configuration as the four-wheel drive vehicle 1 according to the first embodiment, similar effects can be obtained. In addition to this, since the relationship of [Formula 8] is satisfied, by performing the differential rotation, which rotates the front differential gear side a little slower, between each friction plate of the 4WD coupling 23 even in the two-wheel drive state, the four-wheel drive vehicle 22 according to the present embodiment can improve the responsiveness of the driving force transmission by coupling when shifting to the four-wheel drive state and has the advantage of securing high driving performance as a four-wheel drive vehicle.

Modifications

Although the first embodiment and the second embodiment adopt the engine 10 as one example of the power source, the present invention is not limited to this. For example, a hybrid system, which is a combination of an internal combustion engine and an electric motor, can be adopted.

Although the first embodiment and the second embodiment adopt a layout in which the front propeller shaft 17 passes through the vicinity of the outside the room of the pedal working space A of the driver's seat, the present invention is not limited to this. For example, a layout in which the front propeller shaft passes through the vicinity of the outside of the room of the pedal working space of the passenger's seat can be adopted. In this case, the effect that a wide foot space of the front seats can be taken, can be obtained.

In the first embodiment and the second embodiment, although the front propeller shaft 17 is composed of a hollow pipe, the present invention is not limited to this. For example, a front propeller shaft that is composed of a solid shaft body can be adopted.

Moreover, although the constituent material of the front propeller shaft 17 was not specifically mentioned in the first embodiment and the second embodiment, various materials can be used in the present invention. For example, steel or carbon reinforcement fiber can be used.

In FIGS. 1 and 3 showing the first embodiment and the second embodiment, although the front propeller shaft 17 is shown as one pipe, the present invention is not limited to this. For example, the propeller shaft, which has a shaft body and a pipe body and connects the end parts to freely slide relative to each other in an axial direction, can be adopted. Moreover, a propeller shaft in which a plurality of link members are inserted into a middle part of the shaft in the axial direction, can be adopted.

$R_F$, $R_T$, and $R_R$ in the first embodiment are one example, and by comprehensively taking the output of the power source or the reduction ratio at the transmission into consideration, various combinations can be adopted.

In the second embodiment, although an electronic control type 4WD coupling 23 is inserted into a power transmission path between an engine 10 that is a power source and a rear propeller shaft 13, the present invention is not limited to this. For example, a rotation speed responsive type 4WD coupling or an electromagnetic locking type 4WD coupling might be inserted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

EXPLANATION OF REFERENCE CHARACTERS 1, 22 Four-wheel drive vehicle
10 Engine

12 Transfer mechanism
13 Rear propeller shaft
14 Rear differential gear
17 Front propeller shaft
18 Front differential gear
23 4WD coupling.

We claim:

1. A four-wheel drive vehicle comprising:
a power source mounted in a front part of the vehicle for generating a rotation driving force and having an output axis extending in a longitudinal direction of the vehicle;
a rear propeller shaft connected to the power source and extending toward a rear part of the vehicle;
a rear differential gear connected to the rear propeller shaft and provided in the rear part of the vehicle;
a transfer mechanism provided in a power transmission path of the rotation driving force generated at the power source and provided centrally in the longitudinal direction of the vehicle;
a front propeller shaft connected to the transfer mechanism, extending toward the front part of the vehicle along a direction along which the output axis extends, and spaced apart from the output axis in a lateral direction of the vehicle; and
a front differential gear connected to the front propeller shaft and arranged in the front part of the vehicle,
wherein a gear ratio of the front differential gear is smaller than a final gear ratio of the rear differential gear, and a rotational transmission ratio of the transfer mechanism is set greater than one according to the gear ratio of the front differential gear and the final gear ratio of the rear differential gear such that a rotation speed of the front propeller shaft is less than a rotation speed of the rear propeller shaft.

2. The four-wheel drive vehicle according to claim 1, wherein a 4WD coupling for controlling a power distribution to the front differential gear is inserted into the power transmission path between the power source and the rear differential gear.

3. The four-wheel drive vehicle according to claim 1, wherein the front propeller shaft is arranged so as to pass through a vicinity of an outside of a room of a pedal working space of a driver's seat.

4. A four-wheel drive vehicle comprising:
a power source mounted in a front part of the vehicle for generating a rotation driving force and having an output axis extending in a longitudinal direction of the vehicle;
a rear propeller shaft connected to the power source and extending toward a rear part of the vehicle;
a rear differential gear connected to the rear propeller shaft;
a transfer mechanism provided in a power transmission path of the rotation driving force generated at the power source;
a front propeller shaft connected to the transfer mechanism and extending toward the front part of the vehicle along a direction along which the output axis extends; and
a front differential gear connected to the front propeller shaft and arranged in the front part of the vehicle,
wherein a gear ratio of the front differential gear is smaller than a final gear ratio of the rear differential gear, and a transmission ratio of the transfer mechanism is set according to the gear ratio of the front differential gear and the final gear ratio of the rear differential gear;
wherein a 4WD coupling for controlling a power distribution to the front differential gear is inserted into the power transmission path between the power source and the rear differential gear;
wherein the gear ratio of the front differential gear is $R_F$;
wherein the final gear ratio of the rear differential gear is $R_R$;
wherein the transmission ratio of the transfer mechanism is $R_T$; and
wherein $R_F \times R_T < R_T$.

* * * * *